(12) United States Patent
Alpert et al.

(10) Patent No.: US 9,398,249 B2
(45) Date of Patent: Jul. 19, 2016

(54) MOTION ESTIMATION SYSTEM AND METHOD, DISPLAY CONTROLLER, AND ELECTRONIC DEVICE

(71) Applicant: SAMSUNG ELECTRONICS CO., LTD., Gyeonggi-do (KR)

(72) Inventors: Sharon Alpert, Ramat-Gan (IL); Young-Beom Jung, Seoul (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 541 days.

(21) Appl. No.: 13/829,388

(22) Filed: Mar. 14, 2013

(65) Prior Publication Data

US 2014/0002728 A1    Jan. 2, 2014

(30) Foreign Application Priority Data

Jun. 28, 2012  (KR) .................. 10-2012-0070175

(51) Int. Cl.
*H04N 7/01*         (2006.01)
(52) U.S. Cl.
CPC ............. *H04N 7/0127* (2013.01); *H04N 7/014* (2013.01)
(58) Field of Classification Search
None
See application file for complete search history.

(56) References Cited

U.S. PATENT DOCUMENTS

| 5,471,252 | A  | * | 11/1995 | Iu ................................ 348/699 |
| 6,130,912 | A  |   | 10/2000 | Chang et al. |
| 6,584,155 | B2 |   | 6/2003  | Takeda et al. |
| 7,099,392 | B2 |   | 8/2006  | Kim |
| 7,120,276 | B1 |   | 10/2006 | Brady et al. |
| 2005/0134602 | A1 | * | 6/2005 | Winger et al. ................ 345/606 |
| 2008/0165851 | A1 | * | 7/2008 | Shi et al. .................. 375/240.16 |
| 2008/0204592 | A1 | * | 8/2008 | Jia et al. ...................... 348/402.1 |
| 2009/0285299 | A1 |   | 11/2009 | Chen et al. |
| 2010/0053451 | A1 | * | 3/2010 | Seong et al. .................. 348/699 |
| 2010/0166073 | A1 | * | 7/2010 | Schmit et al. ............ 375/240.16 |
| 2010/0271484 | A1 | * | 10/2010 | Fishwick et al. .............. 348/169 |
| 2010/0283892 | A1 | * | 11/2010 | Zhou et al. .................... 348/441 |
| 2011/0050993 | A1 | * | 3/2011 | Wang et al. ................... 348/452 |
| 2011/0075027 | A1 | * | 3/2011 | Wu et al. ....................... 348/452 |
| 2011/0134315 | A1 | * | 6/2011 | Levy et al. .................... 348/441 |
| 2012/0075535 | A1 | * | 3/2012 | Van Beek ...................... 348/699 |

FOREIGN PATENT DOCUMENTS

| JP | 2002-152750 | 5/2002 |
| JP | 2009-080623 | 4/2009 |

(Continued)

*Primary Examiner* — Jay Patel
*Assistant Examiner* — Reza Aghevli
(74) *Attorney, Agent, or Firm* — F. Chau & Associates, LLC

(57) ABSTRACT

A motion estimation system comprises: an initializing module generating a first initial motion field by allocating an initial motion vector to each block of a first motion field related to a first motion change of an image which accompanies a change from an (n−1)-th frame to an n-th frame and generating a second initial motion field allocating an initial motion vector to each block of a second motion field related to a second motion change of the image which accompanies a change from the n-th frame to the (n−1)-th frame; and a candidate test module generating first and second random motion fields based on a similarity function and each block of each of the first and second initial motion fields and random motion vectors, generating first and second spatial propagation motion fields based on the similarity function, and generating first and second optimum motion fields based on the similarity function.

18 Claims, 10 Drawing Sheets

(56) References Cited

FOREIGN PATENT DOCUMENTS

| KR | 1019990043414 | 6/1999 |
| KR | 1020000044735 | 7/2000 |
| KR | 100275694 | 9/2000 |
| KR | 1020050004376 | 1/2005 |
| KR | 1020070000702 | 1/2007 |
| KR | 1020070026317 | 3/2007 |
| KR | 1020110022133 | 3/2011 |

* cited by examiner

FIG. 5

RMF1

BL — arrow ↗ (0,0) | → (0,0) | ↓ (0,0) ← RMV / IMV
↑ (0,0) | → (0,0) | ↖ (0,0)
← (0,0) | ↗ (0,0) | ↑ (0,0)

RMF2

← (0,0) | ↙ (0,0) | → (0,0)
↓ (0,0) | ↙ (0,0) | ↖ (0,0)
↗ (0,0) | → (0,0) | ↑ (0,0)

FIG. 6
SPMF1
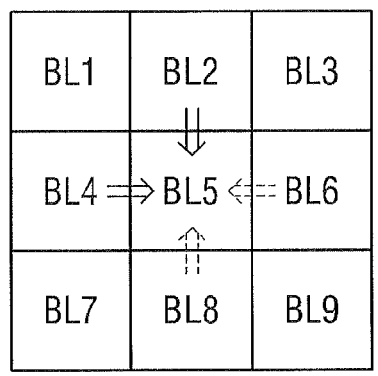
⇒ FORWARD PROPAGATION
⇢ BACKWARD PROPAGATION
SPMF2
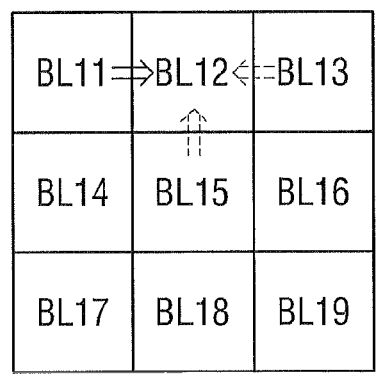
⇒ FORWARD PROPAGATION
⇢ BACKWARD PROPAGATION

3000

MOTION ESTIMATION SYSTEM AND METHOD, DISPLAY CONTROLLER, AND ELECTRONIC DEVICE

This application claims priority from Korean Patent Application No. 10-2012-0070175 filed on Jun. 28, 2012 in the Korean Intellectual Property Office, which is incorporated by reference herein in its entirety.

TECHNICAL FIELD

The present inventive concept relates to a motion estimation system and method, a display controller, and an electronic device.

DISCUSSION OF THE RELATED ART

With the rapid advances in imaging technology, the popularity and variety of imaging apparatuses capable of processing high quality images is increasing. An imaging apparatuses can rapidly process an image sequence (video) having a high quality and a high frame rate by using a processor having a fast processing speed, and a high capacity memory.

However, in the case where an image signal that is input to an imaging apparatus is a low quality image sequence (e.g., an image sequence with a low frame rate), the imaging apparatus may not output a high quality image, even though the imaging apparatus is capable of processing a high quality image. Thus, recently, technologies have been researched and developed to artificially convert a low quality image sequences into a high quality image sequence.

SUMMARY

An aspect of the present inventive concept provides a motion estimation system which can estimate the motion of an image quickly and accurately and generate an estimated image having a smooth motion change.

An aspect of the present inventive concept provides a motion estimation method employed to estimate the motion of an image quickly and accurately and generate an estimated image having a smooth motion change.

An aspect of the present inventive concept provided a display controller including the motion estimation system.

An aspect of the present inventive concept also provides an electronic device including the display controller.

However, features of the present inventive concept are not restricted to the exemplary embodiments set forth herein. The above and other features of the present inventive concept will become more apparent to one of ordinary skill in the art to which the present inventive concept pertains by referencing the detailed description of the present inventive concept given below.

According to an aspect of the present inventive concept, there is provided a motion estimation system comprising: an initializing module generating first and second initial motion fields by allocating an initial motion vector to each block of a first motion field related to a first motion change of an image which accompanies a change from an (n−1)-th frame to an n-th frame and to each block of a second motion field related to a second motion change of the image which accompanies a change from the n-th frame to the (n−1)-th frame; and a candidate test module generating first and second random motion fields by comparing the similarity function value of the initial motion vector allocated to each block of each of the first and second initial motion fields with the similarity function value of a random motion vector, generating first and second spatial propagation motion fields by comparing the similarity function value of a motion vector allocated to each block of each of the first and second random motion fields with similarity function values of motion vectors allocated to adjacent blocks, and generating first and second optimum motion fields by comparing the similarity function value of a motion vector allocated to each block of the first spatial propagation motion field with the similarity function value of a motion vector allocated to each block of the second spatial propagation motion field.

According to an aspect of the present inventive concept, there is provided a motion estimation method comprising: generating first and second initial motion fields by allocating an initial motion vector to each block of a first motion field related to a first motion change of an image which accompanies a change from an (n−1)-th frame to an n-th frame and to each block of a second motion field related to a second motion change of the image which accompanies a change from the n-th frame to the (n−1)-th frame; comparing the initial motion vector allocated to each block of each of the first and second initial motion fields with a random motion vector and generating a first random motion field in which a motion vector closer to the first motion change among the initial motion vector and the random motion vector is allocated to each block and a second random motion field in which a motion vector closer to the second motion change among the initial motion vector and the random motion vector is allocated to each block; comparing the motion vector allocated to each block of each of the first and second random motion fields with motion vectors allocated to adjacent blocks and generating a first spatial propagation motion field in which a motion vector closer to the first motion change among the motion vectors is allocated to each block and a second spatial propagation motion field in which a motion vector closer to the second motion change among the motion vectors is allocated to each block; and comparing the motion vector allocated to each block of the first spatial propagation motion field with the motion vector allocated to each block of the second spatial propagation motion field and generating a first optimum motion field in which a motion vector closer to the first motion change among the motion vectors is allocated to each block and a second optimum motion field in which a motion vector closer to the second motion change among the motion vectors is allocated to each block.

The features of the present inventive concept and methods of accomplishing the same may be understood more readily by reference to the following detailed description of preferred embodiments and the accompanying drawings. The present inventive concept may, however, be embodied in many different exemplary forms and should not be construed as being limited to the embodiments set forth herein. Rather, these exemplary embodiments are provided so that this disclosure will be thorough and complete and will fully convey the concept of the inventive concept to those skilled in the art, and the present inventive concept will only be defined by the appended claims.

The use of the terms "a" and "an" and "the" and similar referents in the context of describing the inventive concept (especially in the context of the following claims) are to be construed to cover both the singular and the plural, unless otherwise indicated herein or clearly contradicted by context.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present inventive concept.

Unless defined otherwise, all technical and scientific terms used herein have the same meaning as commonly understood by one of ordinary skill in the art to which this inventive concept belongs. It is noted that the use of any and all examples, or exemplary terms provided herein is intended merely to better illuminate the inventive concept and is not a limitation on the scope of the inventive concept unless otherwise specified. Further, unless defined otherwise, all terms defined in generally used dictionaries may not be overly interpreted.

BRIEF DESCRIPTION OF THE DRAWINGS

The above and other features of the present inventive concept will become more apparent by describing in detail exemplary embodiments thereof with reference to the attached drawings, in which:

FIGS. 1 through 6 are diagrams illustrating a motion estimation system and method according to an exemplary embodiment of the present inventive concept;

FIG. 1 is a diagram of fields illustrating a motion estimation method according to an exemplary embodiment of the present inventive concept;

FIG. 2 is a block diagram of a motion estimation system configured to perform the motion estimation method of FIG. 1;

FIG. 3 is a diagram of fields for illustrating a motion estimation method of the motion estimation system of FIG. 2;

FIG. 4 is a block diagram of the candidate test module shown in FIG. 2;

FIG. 5 is a diagram of fields for illustrating the motion estimation method of the motion estimation system of FIG. 2;

FIG. 6 is a diagram of fields for illustrating the motion estimation method of the motion estimation system of FIG. 2;

DETAILED DESCRIPTION OF THE EXEMPLARY EMBODIMENTS

Hereinafter, a motion estimation system and method according to an exemplary embodiment of the present inventive concept will be described with reference to FIGS. 1 through 6.

FIGS. 1 through 6 are diagrams illustrating a motion estimation system and method according to an exemplary embodiment of the present inventive concept.

Figure 1:
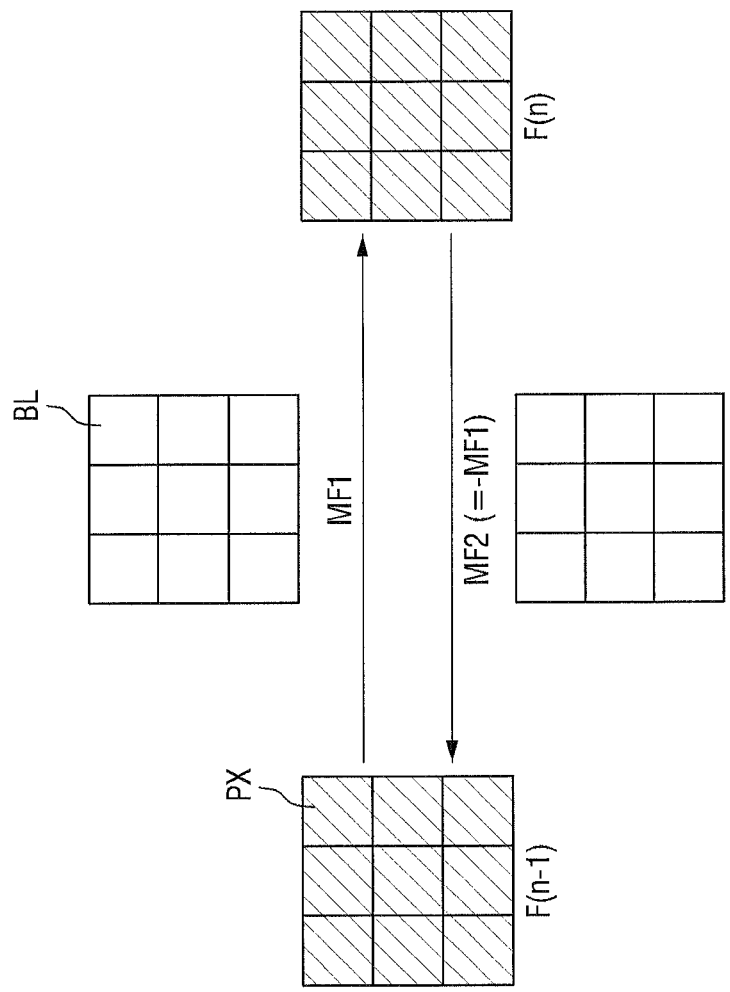

First and second motion fields MF1 and MF2 used in the present specification will be described with reference to FIG. 1. FIG. 1 is a diagram of fields illustrating a motion estimation method according to an exemplary embodiment of the present inventive concept.

Referring to FIG. 1, the first motion field MF1 includes motion vectors related to first motion changes of an image and represents a change from a $(n-1)^{th}$ frame F(n-1) of a video sequence to a timewise-adjacent (sequential) $n_{th}$ frame F(n). Here, the $(n-1)^{th}$ frame F(n-1) and the $n^{th}$ frame F(n) are arranged temporally sequentially. Thus, when the video is played, the $(n-1)^{th}$ frame F(n-1) is displayed before the $n^{th}$ frame F(n).

The second motion field MF2 includes motion vectors related to a second motion change of the image and represents a change from the $n^{th}$ frame F(n) of the video to the prior timewise-adjacent $(n-1)^{th}$ frame F(n-1). Therefore, when the motion vectors included in the first motion field MF1 and the motion vectors included in the second motion field MF2 include motion vectors that accurately estimate the motion of the image, the motion vectors included in the second motion field MF2 are opposite in direction to the motion vectors included in the first motion field MF1 (i.e., MF2=−MF1).

Each of the first and second motion fields MF1 and MF2 includes a plurality of blocks BL. In FIG. 1, each of the first and second motion fields MF1 and MF2 includes nine blocks. However, this is merely an example used for ease of description, and the present inventive concept is not limited to this example.

Each of the blocks BL corresponds to a predetermined number of pixels PX of the corresponding video frame F(n-1) or F(n). In FIG. 1, one block of each of the first and second motion fields MF1 and MF2 corresponds to one pixel of a corresponding video frame F(n-1) or F(n). However, the present inventive concept is not limited thereto. In some embodiments of the present inventive concept, one block of each of the first and second motion fields MF1 and MF2 may correspond to a plurality of pixels of a corresponding video frame F(n-1) or F(n).

Figure 2:
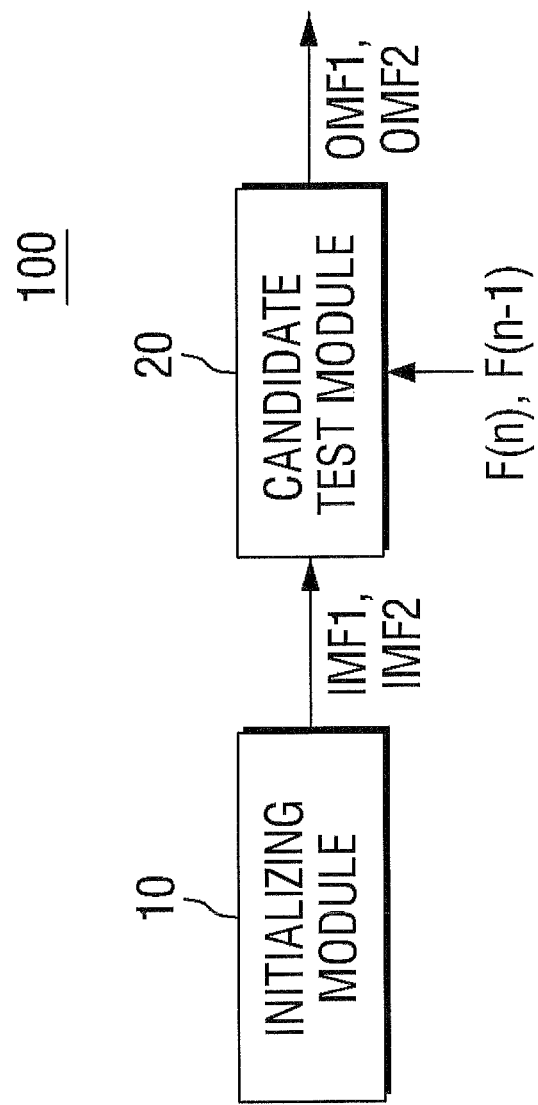

FIG. 2 is a block diagram of a motion estimation system configured to perform the motion estimation method of FIG. 1. Referring to FIG. 2, a motion estimation system 100 includes an initializing module 10 and a candidate test module 20. The term "module", as used herein, means, but is not limited to, a software or hardware component, such as a field programmable gate array (FPGA) or an application specific integrated circuit (ASIC), which performs certain tasks. A module may advantageously be configured to reside in the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Figure 3:
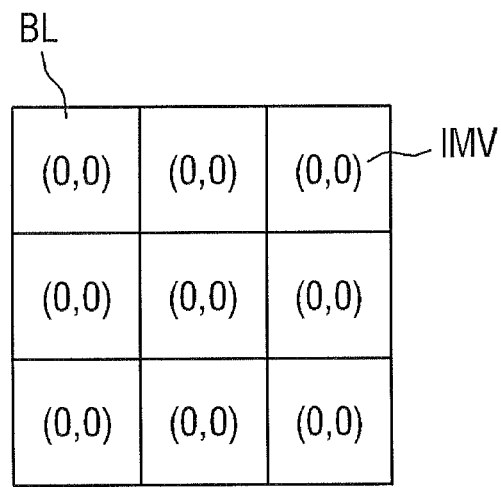

FIG. 3 is a diagram of fields for illustrating a motion estimation method of the motion estimation system of FIG. 2. Referring to FIGS. 2 and 3, the initializing module 10 generates first and second initial motion fields IMF1 and IMF2 by allocating an initial motion vector IMV to every block BL of each of the first and second motion fields MF1 and MF2. In the current exemplary embodiment, the initial motion vector IMV that the initializing module 10 allocates to each block BL of each of the first and second motion fields MF1 and MF2 may be, for example, a zero vector (0, 0). Therefore, the initializing module 10 may allocate the zero vector (0, 0) to each block BL of each of the first and second motion fields MF1 and MF2 to generate the first and second initial motion fields IMF1 and IMF2 having the zero vector (0, 0) allocated to each block BL thereof.

Referring back to FIG. 2, the candidate test module 20 compares the first and second initial motion fields IMF1 and IMF2 with the $(n-1)^{th}$ frame F(n-1) and the $n^{th}$ frame F(n) and generates a first optimum motion field OMF1 used to estimate the first motion change of the image and represents the change from the $(n-1)^{th}$ frame F(n-1) to the $n^{th}$ frame F(n) and a second optimum motion field OMF2 used to estimate the second motion change of the image and represents the change from the $n^{th}$ frame F(n) to the $(n-1)^{th}$ frame F(n-1).

Figure 4:
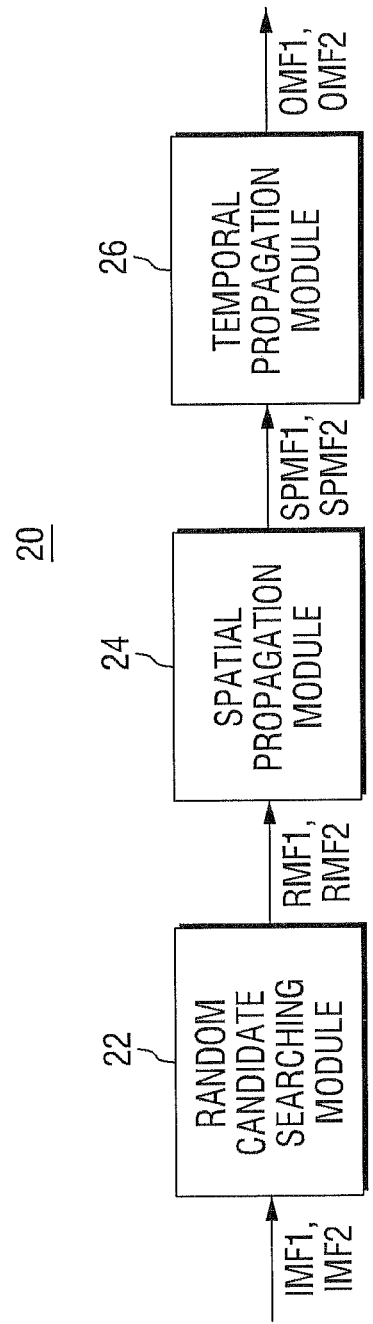

The candidate test module 20 will now be described in more detail with reference to FIG. 4. FIG. 4 is a block diagram of the candidate test module 20 shown in FIG. 2.

Referring to FIG. 4, the candidate test module 20 includes a random candidate searching module 22, a spatial propagation module 24, and a temporal propagation module 26.

FIG. 5 is a diagram of fields for illustrating the motion estimation method of the motion estimation system of FIG. 2. Referring to FIGS. 4 and 5, the random candidate searching module 22 compares the similarity function value of the initial motion vector IMV (e.g., the zero vector (0, 0) in the current exemplary embodiment) allocated to each block BL of each of the first and second initial motion fields IMF1 and IMF2 with the similarity function value of a random motion vector RMV and generates first and second random motion fields RMF1 and RFM2 in which the initial motion vector IMV or the random motion vector RMV with a smaller similarity function value is allocated to each block BL.

More specifically, the random candidate searching module 22 compares the similarity function value of the initial motion vector IMV allocated to each block BL of the first initial motion field IMF1 with that of a randomly generated random motion vector RMV. Here, the similarity function value according to the current exemplary embodiment is determined using the sum of absolute differences (SAD) and a Harris Corner (Feature Point) detection score for a motion vector. More specifically, the similarity function according to the current exemplary embodiment may use the similarity function $(sim(B_i, B_j | \vec{v}))$ defined by Equation (1) below:

$$sim(B_i, B_j | \vec{v}) = SAD(B_i, B_j) + \lambda_1 f_1(\vec{v}) + \lambda_2 f_2(R(B_i)) + \lambda_3 f_3(R(B_i), R(B_{\vec{v}})), \quad (1)$$

(Where $R(B_i)$ denotes the Harris score (C. Harris et al. 1988) normalized such that $R(B_i) \in [0\ 1]$. And $R(B_{\vec{v}})$ is the Harris score of the block which attempts to propagate $\vec{v}$ to $B_i$.

Penalties are defines as follows:

$$f_1(\vec{v}) = \begin{cases} 1 & \vec{v} \text{ is randomlly generated} \\ 0 & \text{otherwise} \end{cases}$$

$$f_1(R(B_i)) = \begin{cases} 1 & R(B_i) < 0.5 \\ 0 & \text{otherwise} \end{cases}$$

$$f_3(R(B_i), (R(B_{\vec{v}}))) = \begin{cases} |R(B_i) - R(B_{\vec{v}})| & \text{if } R(B_i) > R(B_{\vec{v}}) \\ 0 & \text{otherwise} \end{cases}$$

where λ1, λ2, and λ3 are real numbers.)

Thus, in the current exemplary embodiment, as a motion vector allocated to a block is closer to the motion change of an image, the similarity function value of the motion vector is smaller. Therefore, the random candidate searching module 22 compares the similarity function value of the initial motion vector IMV allocated to each block BL of the first initial motion field IMF1 with that of the randomly generated random motion vector RMV and generates the first random motion field RMF1 in which the initial motion vector IMV or the random motion vector RMV with a smaller similarity function value is allocated to each block BL.

Then, the random candidate searching module 22 compares the similarity function value of the initial motion vector IMV allocated to each block BL of the second initial motion field IMF2 with that of a randomly generated random motion vector RMV and generates the second random motion field RMF2 in which the initial motion vector IMV or the random motion vector RMV with the smaller similarity function value is allocated to each block BL. The first random motion field RMF1 generated as described above is closer to the actual first motion change of the image which accompanies the change from the $(n-1)^{th}$ frame F(n-1) to the $n^{th}$ frame F(n) than the first initial motion field IMF1, and the second random motion field RMF2 generated as described above is closer to the second motion of the image change which accompanies the change from the $n^{th}$ frame F(n) to the $(n-1)^{th}$ frame F(n-1) than the second initial motion field IMF2.

FIG. 6 is a diagram of fields for illustrating the motion estimation method of the motion estimation system of FIG. 2. Referring to FIGS. 4 and 6, the spatial propagation module 24 compares the similarity function value of a motion vector allocated to each block of each of the first and second random motion fields RMF1 and RMF2 with the similarity function values of motion vectors allocated to adjacent blocks and generates first and second spatial propagation motion fields SPMF1 and SPMF2 in which the motion vector with the smallest similarity function value among that of the motion vectors is allocated to each block.

The spatial propagation module 24 performs forward propagation, (e.g., compares the similarity function value of a motion vector allocated to each block BL1 to BL9 of the first random motion field RMF1 with those of motion vectors allocated to adjacent blocks located to the left and above each block BL1 to BL9). Then, the spatial propagation module 24 performs backward propagation, (e.g., compares the similarity function value of the motion vector allocated to each block BL1 to BL9 of the first random motion field RMF1 with those of motion vectors allocated to adjacent blocks located to the right and below each block BL1 to BL9).

For example, a motion vector allocated to a fifth block BL5 of the first random motion field RMF1 is compared with the motion vector allocated to a fourth block BL4 located to the left of the fifth block BL5 and the motion vector allocated to a second block BL2 located above the fifth block BL5 through forward propagation. Then, the motion vector allocated to the fifth block BL5 of the first random motion field RMF1 is compared with the motion vector allocated to a sixth block BL6 located to the right of the fifth block BL5 and the motion vector allocated to an eighth block BL8 located below the fifth block BL5 through backward propagation.

Therefore, when the motion vector allocated to a block adjacent to each block BL1 to BL9 of the first random motion field RMF1 is closer to a motion change of an image (e.g., has a smaller similarity function value) than the motion vector allocated to each block BL1 to BL9 of the first random motion field RMF1, the motion vector allocated to each block BL1 to BL9 of the first random motion field RMF1 is sequentially changed to the motion vector allocated to the adjacent block. As a result, the motion vector allocated to each block BL1 to BL9 of the first spatial propagation motion field SPMF1 is closer to the first motion change of the image which accompanies the change from the $(n-1)^{th}$ frame F(n-1) of the video to the $n^{th}$ frame F(n) than the motion vector allocated to each block BL1 to BL9 of the first random motion field RMF1.

Next, the spatial propagation module 24 also performs forward propagation (e.g., compares a twelfth block BL12 with an eleventh block BL11) and backward propagation (e.g., compares the twelfth block BL12 with a thirteenth block BL13) on each block BL11 to BL19 of the second random motion field RMF1. As a result, the spatial propagation module 24 generates the second spatial propagation motion field SPMF2 in which the motion vector allocated to each block BL11 to BL19 is closer to the second motion change of the image which accompanies the change from the $n^{th}$ frame F(n) to the $(n-1)^{th}$ frame F(n-1) than the motion vector allocated to each block BL11 to BL19 of the second random motion field RMF2.

Referring to FIG. 4, the temporal propagation module 26 compares the similarity function value of the motion vector allocated to each block of the first spatial propagation motion field SPMF1 with the similarity function value of the motion vector allocated to each block of the second spatial propagation motion field SPMF2 and generates first and second optimum motion fields OMF1 and OMF2 in which the motion vector with a smaller similarity function value among the motion vectors is allocated to each block. Thus, the temporal propagation module 26 compares respective blocks of the first spatial propagation motion field SPMF1 and the second spatial propagation motion field SPMF2 (which have a temporally inverse relationship) to find an optimum motion vector.

Specifically, the temporal propagation module 26 compares the similarity function value of the motion vector allocated to each block BL1 to BL9 (see FIG. 6) of the first spatial propagation motion field SPMF1 with the similarity function value of the motion vector allocated to each block BL11 to BL19 (see FIG. 6) of the second spatial propagation motion field SPMF2 and generates the first optimum motion field OMF1 in which the motion vector with the smallest similarity function value among the motion vectors is allocated to each block. For example, when the similarity function value of the motion vector allocated to a fifth block BL5 (see FIG. 6) of the first spatial propagation motion field SPMF1 is smaller than that of the motion vector allocated to a fifteenth block BL15 (see FIG. 6) of the second spatial propagation motion field SPMF2, the motion vector allocated to the fifth block BL5 shall be allocated to the fifth block BL5 of the first optimum motion field OMF1. Otherwise, the motion vector allocated to the fifteenth block BL15 (see FIG. 6) of the second propagation motion field SPMF2 shall be allocated to the fifth block BL5 of the first optimum motion field OMF1.

Here, the motion vector allocated to each block BL1 to BL9 (see FIG. 6) of the first spatial propagation motion field SPMF1 may have a temporally inverse relationship with the motion vector allocated to each block BL11 to BL19 (see FIG. 6) of the second spatial propagation motion field SPMF2. Specifically, the first motion field MF1 based on which the first spatial propagation motion field SPMF1 is generated includes motion vectors (see FIG. 1) related to the first motion change which accompanies the change from the $(n-1)^{th}$ frame F(n-1) of the video to the $n_{th}$ frame F(n), and the second motion field MF2 based on which the second spatial propagation motion field SPMF2 is generated includes motion vectors (see FIG. 1) related to the second motion change which accompanies the change from the $n^{th}$ frame F(n) to the $(n-1)^{th}$ frame F(n-1). Therefore, the motion vector allocated to each block BL1 to BL9 (see FIG. 6) of the first spatial propagation motion field SPMF1 may have a temporally inverse relationship with the motion vector allocated to each block BL11 through BL19 (see FIG. 6) of the second spatial propagation motion field SPMF2 . Accordingly, in some embodiments of the present inventive concept, opposite signs (opposite in direction) may be used to describe the relation between the motion vector allocated to each block BL1 to BL9 (see FIG. 6) of the second spatial propagation motion field SPMF2 and the motion vector allocated to each block BL11 to BL19 (see FIG. 6) of the first spatial propagation motion field SPMF1.

Once the first optimum motion field OMF1 is generated as described above, the temporal propagation module 26 compares the similarity function value of the motion vector allocated to each block BL11 to BL19 (see FIG. 6) of the second spatial propagation motion field SPMF2 with that of the motion vector allocated to each block BL1 to BL9 (see FIG. 6) of the first spatial propagation motion field SPMF1 and generates the second optimum motion field OMF2 in which a motion vector with the smallest similarity function value among the motion vectors is allocated to each block.

The first optimum motion field OMF1 generated as described above is closer to the first motion change of the image which accompanies the change from the $(n-1)^{th}$ frame F(n-1) of the video to the $n^{th}$ frame F(n) than the first spatial propagation motion field SPMF1. In addition, the second optimum motion field OMF2 is closer to the second motion change of the image which accompanies the change from the $n^{th}$ frame F(n) of the video to the $(n-1)^{th}$ frame F(n-1) than the second spatial propagation motion field SPMF2.

To estimate the motion change of an image which accompanies a change between frames, each block of a motion field may be compared with each block of a frame. This method may be advantageous in terms of accuracy but it requires too much time and cost. Therefore, in the current exemplary embodiment, an initially allocated motion vector is compared with a randomly generated random motion vector, and spatial propagation and temporal propagation are performed based on the comparison result. As a result, an optimum motion field for estimating the motion change of an image can be generated relatively accurately and quickly. Furthermore, in the current exemplary embodiment, a motion vector closer to the motion change of an image is propagated to spatially and temporally adjacent blocks by the spatial and temporal propagation. Therefore, an estimated image can have a smooth motion change.

Hereinafter, a motion estimation system and method according to an exemplary embodiment of the present inventive concept will be described with reference to FIGS. 2 and 7.

Figure 7:
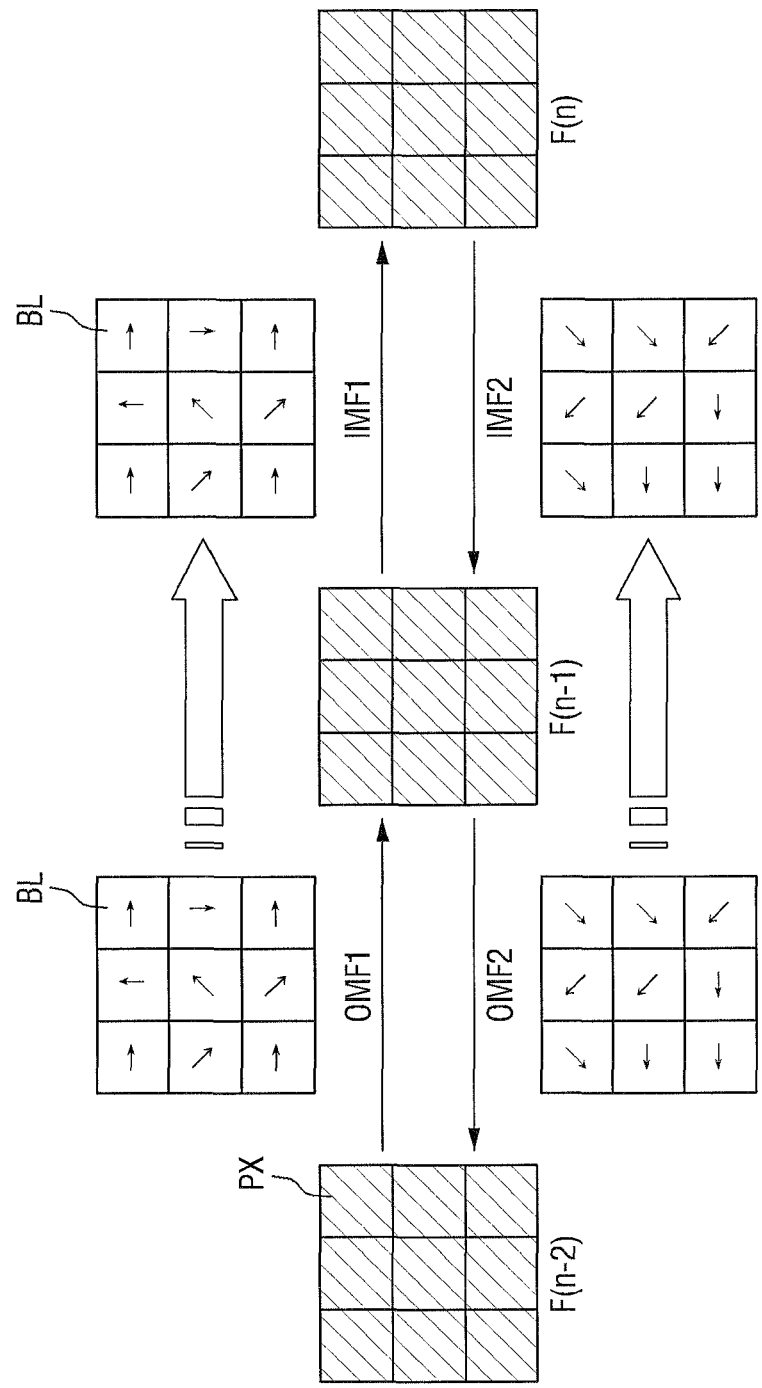
FIG. 7 is a diagram illustrating a motion estimation system and method according to an exemplary embodiment of the present inventive concept.

FIG. 7 is a diagram illustrating a motion estimation system and method according to an exemplary embodiment of the present inventive concept. For simplicity, any repetitive description of elements substantially identical to those of the previous embodiment will be omitted, and the following description will focus on differences between the current and previous embodiments.

Referring to FIGS. 2 and 7, an initializing module 10 according to the current exemplary embodiment allocates a motion vector to each block of a third optimum motion field OMF3 as an initial motion vector allocated to each block of a first initial motion field IMF1 and allocate a motion vector allocated to each block of a fourth optimum motion field OMF4 as an initial motion vector allocated to each block of a second initial motion field IMF2. The $(n-1)^{th}$ frame F(n-1) and an $n^{th}$ frame F(n) are temporally later than the $(n-2)^{th}$ frame F(n-2).

A third optimum motion field OMF3 is a motion field used to estimate a third motion change of an image which accompanies a change from a $(n-2)^{th}$ frame F(n-2) to a $(n-1)^{th}$ frame F(n-1). The third optimum motion field OMF3 may be an optimum motion field generated for the $(n-2)^{th}$ frame $F(n-2)$ and the $(n-1)^{th}$ frame $F(n-1)$ using the above-described method. Also, the fourth optimum motion field OMF4 is a motion field used to estimate a fourth motion change of an image which accompanies a change from the $(n-1)^{th}$ frame $F(n-1)$ to the $(n-2)^{th}$ frame $F(n-2)$. The fourth optimum motion field OMF4 may be an optimum motion field generated for the $(n-1)^{th}$ frame $F(n-1)$ and the $(n-2)^{th}$ frame $F(n-2)$ using the above-described method. Thus, in the current exemplary embodiment, the third and fourth optimum motion fields OMF3 and OMF4 generated for the $(n-2)^{th}$ frame $F(n-2)$ and the $(n-1)^{th}$ frame $F(n-1)$ using the above-described method are used as initial motion fields IMF1 and IMF2 of the $(n-1)^{th}$ frame $F(n-1)$ and an $n^{th}$ frame $F(n)$ which are output temporally later than the $(n-2)^{th}$ frame $F(n-2)$ and the $(n-1)^{th}$ frame $F(n-1)$.

Then, first and second random motion fields RMF1 and RMF2 are generated by comparing the similarity function value of an initial motion vector allocated to each block of each of the initial motion fields IMF1 and IMF2 with the similarity function value of a randomly generated random motion vector RMV; and first and second optimum motion fields OMF1 and OMF2 are generated by performing spatial propagation and temporal propagation on the first and second random motion fields RMF1 and RMF2. Since this process has already been described above, a detailed description thereof will be omitted.

According to the current exemplary embodiment, the third and fourth optimum motion fields OMF3 and OMF4 generated for the $(n-2)^{th}$ frame $F(n-2)$ and the $(n-1)^{th}$ frame $F(n-1)$ are used to generate the first and second optimum motion fields OMF1 and OMF2 for the $(n-1)^{th}$ frame $F(n-1)$ and the $n^{th}$ frame $F(n)$ which are output temporally later than the $(n-2)^{th}$ frame $F(n-2)$ and the $(n-1)^{th}$ frame $F(n-1)$, respectively. Therefore, the accuracy of motion estimation can be increased.

Hereinafter, a motion estimation system and method according to an exemplary embodiment of the present inventive concept will be described with reference to FIGS. 4 and 8.

Figure 8:
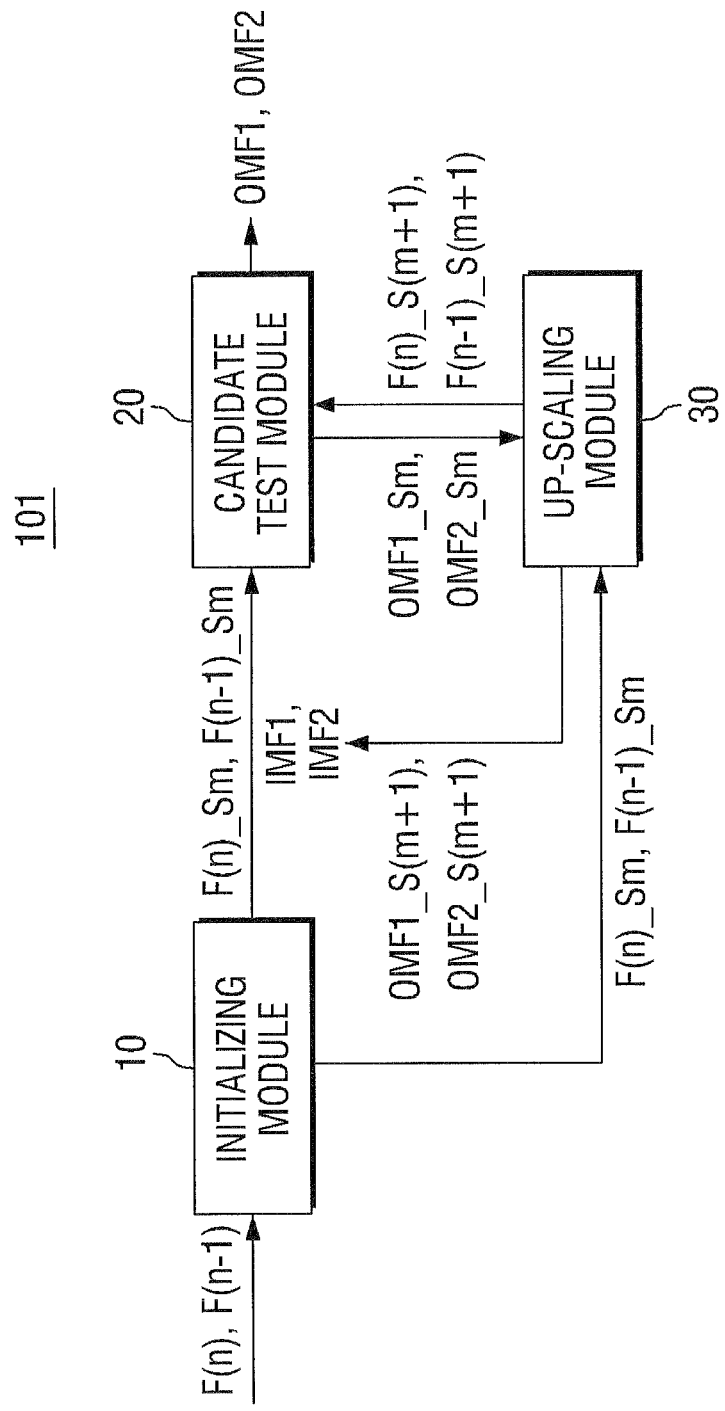
FIG. 8 is a block diagram of a motion estimation system and method according to an exemplary embodiment of the present inventive concept.

FIG. 8 is a diagram illustrating a motion estimation system and method according to an exemplary embodiment of the present inventive concept. For simplicity, any repetitive description of elements substantially identical to those of the previous embodiments will be omitted, and the following description will focus on differences between the current and previous embodiments.

Referring to FIGS. 4 and 8, a motion estimation system 101 according to the current exemplary embodiment is similar to the exemplary embodiment of FIG. 2 and further includes an upscaling module 30. The upscaling module 30 receives downscaled first and second optimum motion fields OMF1_Sm and OMF2_Sm from a candidate test module 20, upscales the downscaled first and second optimum motion fields OMF1_Sm and OMF2_Sm, and provides the upscaled first and second optimum motion fields OMF1_S(m+1) and OMF2_S(m+1) as first and second initial motion fields IMF1 (=OMF1_S(m+1)) and IMF2 (=OMF2_S(m+1)).

The motion estimation system 101 and method according to the current exemplary embodiment will now be described sequentially.

An initializing module 10 sequentially receives a $(n-1)^{th}$ frame $F(n-1)$ and an $n^{th}$ frame $F(n)$, downscales the $(n-1)^{th}$ frame $F(n-1)$ and the $n^{th}$ frame $F(n)$ to a minimum size, and outputs the downscaled frames $F(n-1)\_Sm$ and $F(n)\_Sm$ to a candidate test module 20 and the upscaling module 30. In addition, the initializing module 10 generates the first and second initial motion fields IMF1 and IMF2 by allocating an initial motion vector IMV to each block BL of each of downscaled first and second motion fields MF1 and MF2 to correspond to the downscaled frames $F(n-1)\_Sm$ and $F(n)\_Sm$.

Then, the candidate test module 20 generates the downscaled first and second optimum motion fields OMF1_Sm and OMF2_Sm based on the downscaled frames $F(n-1)\_Sm$ and $F(n)\_Sm$ and using the above-described method.

The upscaling module 30 receives the downscaled first and second optimum motion fields OMF1_Sm and OMF2_Sm, generates the upscaled first and second optimum motion fields OMF1_S(m+1) and OMF2_S(m+1) by upscaling the downscaled first and second optimum motion fields OMF1_Sm and OMF2_Sm, and provides the upscaled first and second optimum motion fields OMF1_S(m+1) and OMF2_S(m+1) as the first and second initial motion fields IMF1 (=OMF1_S(m+1)) and IMF2 (=OMF2_S(m+1)). Also, the upscaling module 30 receives the downscaled $(n-1)^{th}$ frame $F(n-1)\_Sm$ and the downscaled $n^{th}$ frame $F(n)\_Sm$, generates an upscaled $(n-1)^{th}$ frame $F(n-1)\_S(m+1)$ and an upscaled $n^{th}$ frame $F(n)\_S(m+1)$ by upscaling the downscaled $(n-1)^{th}$ frame $F(n-1)\_Sm$ and the downscaled $n^{th}$ frame $F(n)\_Sm$. The upscaling module 30 provides the upscaled $(n-1)^{th}$ frame $F(n-1)\_S(m+1)$ and the upscaled $n^{th}$ frame $F(n)\_S(m+1)$ to a random candidate searching module 22, a spatial propagation module 24, and a temporal propagation module 26 of the candidate test module 20 for calculation of similarity function values.

Thus, the upscaling module 30 enables the motion estimation system 101 according to the current exemplary embodiment to generate optimum motion fields OMF1 and OMF2 in a multi-scaling environment. When an image has very high resolution, a very complicated calculation process is required to conventionally estimate a motion field of the image. However, the motion estimation system 101 according to the current exemplary embodiment can estimate an optimum motion field for an image through the above-described multi-scaling operation. Therefore, even when an image has very high resolution, an optimum motion field can be estimated without excessive computational load.

The upscaling scope and frequency of the motion estimation system 101 according to the current exemplary embodiment can be varied as desired. For example, in various exemplary embodiments of the present inventive concept, optimum motion fields OMF1_Sm and OMF2_Sm are generated for frames $F(n-1)\_Sm$ and $F(n)\_Sm$ of a 320×320 size, and the frames $F(n-1)\_Sm$ and $F(n)\_Sm$ and the optimum motion fields OMF1_Sm and OMF2_Sm are upscaled to a 640×640 size, thereby generating optimum motion fields OMF1_S(m+1) and OMF2_S(m+1). In various other exemplary embodiments of the present inventive concept, frames and optimum motion fields can be upscaled to sizes of 320×320, 640×640 and 1280×1280 sequentially to generate optimum motion fields.

In FIG. 8, the initializing module 10 downscales the frames $F(n-1)$ and $F(n)$ to a minimum size. However, the present inventive concept is not limited thereto. In various alternative embodiments of the present inventive concept, the motion estimation system 101 may further include a downscaling module (not shown) which downscales the frames $F(n-1)$ and $F(n)$ to a minimum size.

Hereinafter, a display controller according to an exemplary embodiment of the present inventive concept will be described with reference to FIG. 9.

Figure 9:
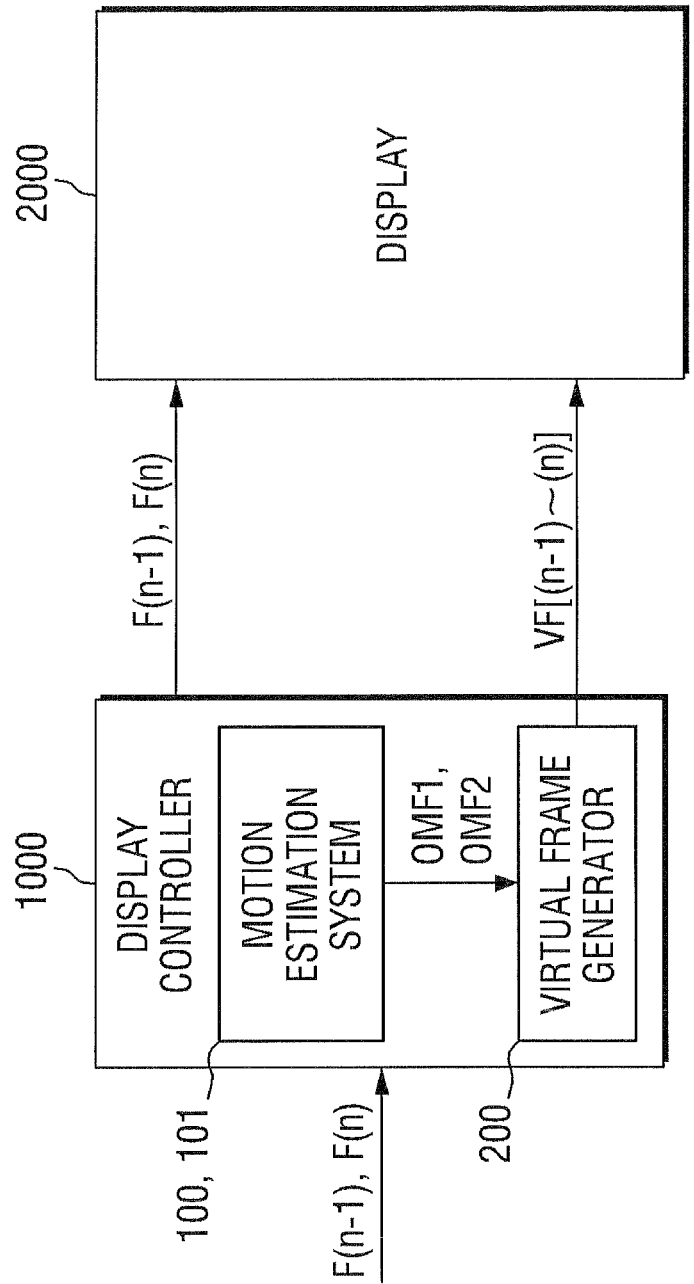
FIG. 9 is a diagram illustrating a display controller according to an exemplary embodiment of the present inventive concept.

FIG. 9 is a diagram illustrating a display controller 1000 according to an exemplary embodiment of the present inventive concept.

Referring to FIG. 9, the display controller 1000 includes a motion estimation system 100 or 101 and a virtual frame generator 200.

The motion estimation system 100 or 101 receives a $(n-1)^{th}$ frame F(n-1) and an $n^{th}$ frame F(n) and outputs a first optimum motion field OMF1 used to estimate a first motion change of an image which accompanies a change from the $(n-1)^{th}$ frame F(n-1) to the $n^{th}$ frame and a second optimum motion field OMF2 used to estimate a second motion change of an image which accompanies a change from the $n^{th}$ frame F(n) to the $(n-1)^{th}$ frame F(n-1) according to any one of the above-described embodiments.

The virtual frame generator 200 receives the first and second optimum motion fields OMF1 and OMF2 from the motion estimation system 100 or 101, generates a virtual frame VF[(n-1)~(n)] between the $(n-1)^{th}$ frame F(n-1) and the $n^{th}$ frame F(n) based on the first and second optimum motion fields OMF1 and OMF2, and outputs the virtual frame VF[(n-1)~(n)] to the display 2000. Accordingly, the display 2000 sequentially displays an image of the $(n-1)^{th}$ frame F(n-1), an image of the virtual frame VF[(n-1)~(n)], and an image of the $n^{th}$ frame F(n).

Hereinafter, an electronic device according to an exemplary embodiment of the present inventive concept will be described with reference to FIG. 10.

Figure 10:
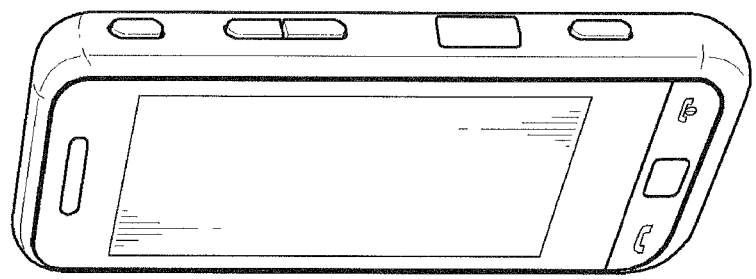
FIG. 10 is a diagram illustrating an electronic device according to an exemplary embodiment of the present inventive concept.

FIG. 10 is a diagram illustrating an electronic device 3000 according to an exemplary embodiment of the present inventive concept.

Referring to FIG. 10, the electronic device 3000 according to the current exemplary embodiment may be a mobile terminal such as a smartphone. The electronic device 3000 may include a display controller 1000 (see FIG. 9) and a display 2000 (see FIG. 9) according to the above-described embodiment. Although a mobile terminal is illustrated in FIG. 10 as an example of the electronic device 3000, the present inventive concept is not limited to this example. In some embodiments, the electronic device 3000 may be a portable computer, a communication device, or a home electronic appliance such as a television.

Those skilled in the art will appreciate that many variations and modifications can be made to the exemplary embodiments without substantially departing from the principles of the present inventive concept. Therefore, the disclosed exemplary embodiments of the inventive concept are used in a generic and descriptive sense only and not for purposes of limitation.

What is claimed is:

1. A motion estimation system comprising:
an initializing circuit generating first and second initial motion fields by allocating an initial motion vector to each block of a first motion field related to a first motion change of an image which accompanies a change from an (n−1)-th frame to an n-th frame and to each block of a second motion field related to a second motion change of the image which accompanies a change from the n-th frame to the (n−1)-th frame;
a candidate test circuit generating first and second random motion fields by comparing a similarity function value of the initial motion vector allocated to each block of each of the first and second initial motion fields with a similarity function value of a random motion vector, generating first and second spatial propagation motion fields by comparing a similarity function value of a motion vector allocated to each block of each of the first and second random motion fields with similarity function values of motion vectors allocated to adjacent blocks, and generating first and second optimum motion fields by comparing a similarity function value of a motion vector allocated to each block of the first spatial propagation motion field with a similarity function value of a motion vector allocated to each block of the second spatial propagation motion field;
a random candidate searching circuit comparing the similarity function value of the initial motion vector allocated to each block of each of the first and second initial motion fields with the similarity function value of the random motion vector and generating the first and second random motion fields in which a motion vector with a smaller similarity function value among the initial motion vector and the random motion vector is allocated to each block;
a temporal propagation circuit comparing the similarity function value of the motion vector allocated to each block of the first spatial propagation motion field with the similarity function value of the motion vector allocated to each block of the second spatial propagation motion field and generating the first and second optimum motion fields in which a motion vector with a smaller similarity function value among the motion vectors is allocated to each block; and
an upscaling circuit which receives the first and second optimum motion fields from the temporal propagation circuit, upscales the first and second optimum motion fields, and provides the upscaled first and second optimum motion fields to the random candidate searching circuit as the first and second initial motion fields.

2. The motion estimation system of claim 1, wherein the initial motion vector comprises a zero vector.

3. The motion estimation system of claim 1, wherein the similarity function value is determined in view of sum of absolute differences (SAD) and Harris score for the motion vector.

4. The motion estimation system of claim 1, wherein the comparing of the similarity function value of the motion vector allocated to each block of each of the first and second random motion fields with the similarity function values of the motion vectors allocated to the adjacent blocks comprises comparing the similarity function value of the motion vector allocated to each block of each of the first and second random motion fields with similarity function values of motion vectors allocated to adjacent blocks located to the left and above each block of each of the first and second random motion fields.

5. The motion estimation system of claim 4, wherein the comparing of the similarity function value of the motion vector allocated to each block of each of the first and second random motion fields with the similarity function values of the motion vectors allocated to the adjacent blocks further comprises comparing the similarity function value of the motion vector allocated to each block of each of the first and second random motion fields with similarity function values of motion vectors allocated to adjacent blocks located to the right and below each block of each of the first and second random motion fields.

6. The motion estimation system of claim 1, wherein the initial motion vector allocated to each block of the first initial motion field comprises a motion vector allocated to each block of a third optimum motion field, and the initial motion vector allocated to each block of the second initial motion field comprises a motion vector allocated to each block of a fourth optimum motion field, wherein the third optimum motion field is a motion field used to estimate a third motion change of the image which accompanies a change from an (n−2)-th frame to the (n−1)-th frame, and the fourth optimum motion field is a motion field used to estimate a fourth motion change of the image which accompanies a change from the (n−1)-th frame to the (n−2)-th frame.

7. The motion estimation system of claim 1, wherein the candidate test circuit comprises:
   a spatial propagation circuit comparing the similarity function value of the motion vector allocated to each block of each of the first and second random motion fields with the similarity function values of the motion vectors allocated to the adjacent blocks and generating the first and second spatial propagation motion fields in which a motion vector with a smaller similarity function value among the motion vectors is allocated to each block.

8. The motion estimation system of claim 7, wherein the upscaling circuit upscales the (n−1)-th frame and the n-th frame and provides the upscaled (n−1)-th frame and the upscaled n-th frame to the random candidate searching circuit, the spatial propagation circuit and the temporal propagation circuit.

9. A motion estimation method comprising:
   generating first and second initial motion fields by allocating an initial motion vector to each block of a first motion field related to a first motion change of an image which accompanies a change from an (n−1)-th frame to an n-th frame and to each block of a second motion field related to a second motion change of the image which accompanies a change from the n-th frame to the (n−1)-th frame;
   comparing the initial motion vector allocated to each block of each of the first and second initial motion fields with a random motion vector and generating a first random motion field in which a motion vector closer to the first motion change among the initial motion vector and the random motion vector is allocated to each block and a second random motion field in which a motion vector closer to the second motion change among the initial motion vector and the random motion vector is allocated to each block;
   comparing the motion vector allocated to each block of each of the first and second random motion fields with motion vectors allocated to adjacent blocks and generating a first spatial propagation motion field in which a motion vector closer to the first motion change among the motion vectors is allocated to each block and a second spatial propagation motion field in which a motion vector closer to the second motion change among the motion vectors is allocated to each block;
   comparing the motion vector allocated to each block of the first spatial propagation motion field with the motion vector allocated to each block of the second spatial propagation motion field and generating a first optimum motion field in which a motion vector closer to the first motion change among the motion vectors is allocated to each block and a second optimum motion field in which a motion vector closer to the second motion change among the motion vectors is allocated to each block; and
   upscaling the (n−1)-th frame, the n-th frame, and the first and second optimum motion fields;
   generating the upscaled first and second optimum motion fields as the first and second initial motion fields; and
   generating the first and second random motion fields, the first and second spatial propagation motion fields, and the first and second optimum motion fields using the upscaled first and second optimum motion fields as the first and second initial motion fields.

10. The motion estimation method of claim 9, wherein the initial motion vector comprises a zero vector.

11. The motion estimation method of claim 9, wherein the initial motion vector allocated to each block of the first initial motion field comprises a motion vector allocated to each block of a third optimum motion field, and the initial motion vector allocated to each block of the second initial motion field comprises a motion vector allocated to each block of a fourth optimum motion field, wherein the third optimum motion field is a motion field used to estimate a third motion change of the image which accompanies a change from an (n−2)-th frame to the (n−1)-th frame, and the fourth optimum motion field is a motion field used to estimate a fourth motion change of the image which accompanies a change from the (n−1)-th frame to the (n−2)-th frame.

12. The motion estimation method of claim 9, wherein the comparing of the motion vector allocated to each block of each of the first and second random motion fields with the motion vectors allocated to the adjacent blocks comprises comparing the motion vector allocated to each block of each of the first and second random motion fields with motion vectors allocated to adjacent blocks located to the left and above each block of each of the first and second random motion fields.

13. The motion estimation method of claim 12, wherein the comparing of the motion vector allocated to each block of each of the first and second random motion fields with the motion vectors allocated to the adjacent blocks further comprises comparing the motion vector allocated to each block of each of the first and second random motion fields with motion vectors allocated to adjacent blocks located to the right and below each block of each of the first and second random motion fields.

14. A motion estimation system comprising:
   an initializing circuit configured to generate a first initial motion field by allocating an initial motion vector to each block of a first motion field related to a first motion change of an image which accompanies a change from an (n−1)-th frame to an n-th frame, and configured to generate a second initial motion field by allocating an initial motion vector to each block of a second motion field related to a second motion change of the image which accompanies a change from the n-th frame to the (n−1)-th frame;
   a candidate test circuit configured to:
   generate a first random motion field by comparing the similarity function value of the initial motion vector allocated to each block of the first initial motion field with the similarity function value of a random motion vector, and
   configured to generate a second random motion field by comparing the similarity function value of the initial motion vector allocated to each block the second initial motion field with the similarity function value of a random motion vector;
   a random candidate searching circuit comparing the similarity function value of the initial motion vector allocated to each block of each of the first and second initial motion fields with the similarity function value of the random motion vector and generating the first and second random motion fields in which a motion vector with a smaller similarity function value among the initial motion vector and the random motion vector is allocated to each block;
   a temporal propagation circuit comparing the similarity function value of the motion vector allocated to each block of the first spatial propagation motion field with the similarity function value of the motion vector allocated to each block of the second spatial propagation motion field and generating the first and second optimum motion fields in which a motion vector with a smaller similarity function value among the motion vectors is allocated to each block; and an upscaling circuit which receives the first and second optimum motion fields from the temporal propagation circuit, upscales the first and second optimum motion fields, and provides the upscaled first and second optimum motion fields to the random candidate searching circuit as the first and second initial motion fields.

15. The motion estimation system of claim 14, wherein the candidate test circuit is further configured to:

and configured to generate a first spatial propagation motion field by comparing the similarity function value of a motion vector allocated to each block of the first random motion field with similarity function values of motion vectors allocated to adjacent blocks, and configured to generate a second spatial propagation motion field by comparing the similarity function value of a motion vector allocated to each block of the second random motion field with similarity function values of motion vectors allocated to adjacent blocks, and configured to generate first and second optimum motion fields by comparing the similarity function value of a motion vector allocated to each block of the first spatial propagation motion field with the similarity function value of a motion vector allocated to each block of the second spatial propagation motion field.

16. The motion estimation system of claim 14, wherein the similarity function value is determined in view of sum of absolute differences (SAM) and Harris score for the motion vector.

17. The motion estimation system of claim 14, wherein the comparing of the similarity function value of the motion vector allocated to each block of the first random motion field with the similarity function values of the motion vectors allocated to the adjacent blocks comprises comparing the similarity function value of the motion vector allocated to each block of the first random motion field with similarity function values of motion vectors allocated to adjacent blocks located to the left and above each block of the first random motion field, and wherein the comparing of the similarity function value of the motion vector allocated to each block of the second random motion field with the similarity function values of the motion vectors allocated to the adjacent blocks comprises comparing the similarity function value of the motion vector allocated to each block of the second random motion field with similarity function values of motion vectors allocated to adjacent blocks located to the left and above each block of the second random motion field.

18. The motion estimation system of claim 17, wherein the comparing of the similarity function value of the motion vector allocated to each block of the first random motion field with the similarity function values of the motion vectors allocated to the adjacent blocks further comprises comparing the similarity function value of the motion vector allocated to each block of the first random motion field with similarity function values of motion vectors allocated to adjacent blocks located to the right and below each block of the first random motion field, and wherein the comparing of the similarity function value of the motion vector allocated to each block of the second random motion field with the similarity function values of the motion vectors allocated to the adjacent blocks further comprises comparing the similarity function value of the motion vector allocated to each block of the second random motion field with similarity function values of motion vectors allocated to adjacent blocks located to the right and below each block of the second random motion field.

* * * * *